C. S. JOHNSON.
VOLTAGE REGULATOR.
APPLICATION FILED OCT. 20, 1904. RENEWED NOV. 7, 1907.
961,411.
Patented June 14, 1910.
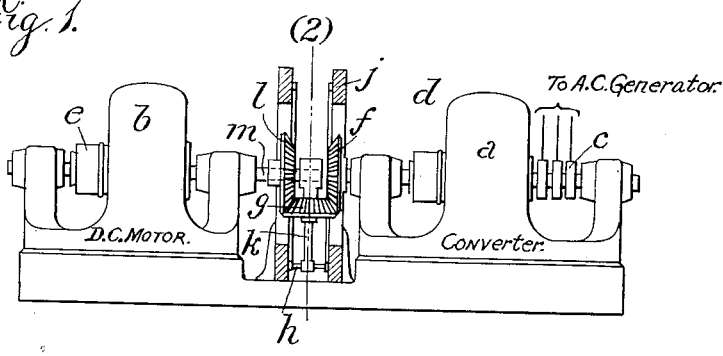
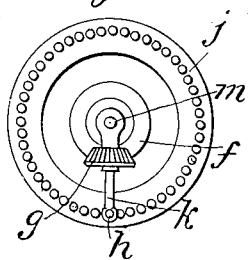
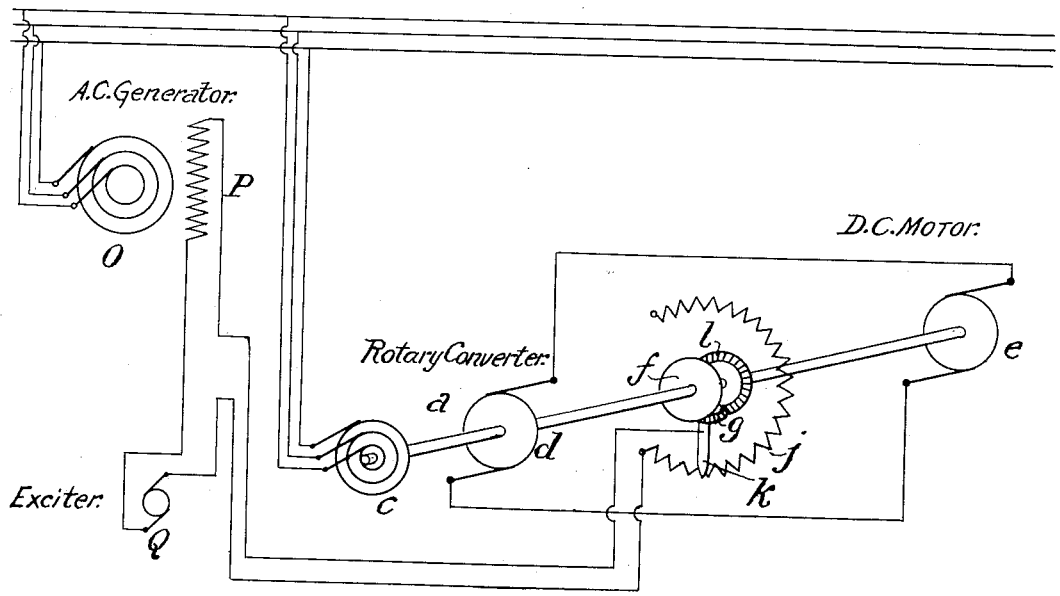
WITNESSES
INVENTOR
Charles S. Johnson

UNITED STATES PATENT OFFICE.

CHARLES SUNDERLAND JOHNSON, OF CHICAGO, ILLINOIS, ASSIGNOR, BY MESNE ASSIGNMENTS, TO THE WESTINGHOUSE ELECTRIC AND MANUFACTURING COMPANY, OF PITTSBURG, PENNSYLVANIA, A CORPORATION OF PENNSYLVANIA.

VOLTAGE-REGULATOR.

961,411.  Specification of Letters Patent.  Patented June 14, 1910.

Application filed October 20, 1904, Serial No. 229,237. Renewed November 7, 1907. Serial No. 401,163.

*To all whom it may concern:*

Be it known that I, CHARLES S. JOHNSON, a citizen of the United States, residing at Chicago, in the county of Cook and State of Illinois, have invented certain new and useful Improvements in Voltage-Regulators, of which the following is a specification.

My invention relates to alternating current electric systems, and particularly to means for automatic control of voltage regulating apparatus in such systems. The primary object of the invention is to regulate and render practically constant the voltage or potential of an alternating current circuit; and to provide improved automatic mechanism for this purpose. Other objects and advantages gained will appear in the description hereafter. For purposes of illustration, I have shown herein an arrangement of apparatus as applied to the case where an alternating current generator provides current which, by means of a rotary converter, is converted into direct circuit and a direct-current motor is driven thereby. In the accompanying drawings, Figure 1 is a side elevation of a converter and direct current motor mounted together on a frame and provided with my regulating apparatus, Figure 2 is an end elevation of the rheostat and the traveling contact arm and means for shifting it, and Figure 3 is a diagram of the same apparatus, illustrating the wiring of the various circuits, etc.

In practice I may employ in my apparatus any devices which, by means of variations in the speed of the motor, will alter the voltage in the generator circuit, as by varying the resistance of the field magnet circuit of the alternating current generator; but, in the present instance, I have shown a differential speed device which is geared between the shafts of a converter and a direct current motor. Thus, in the accompanying Figure 1, it will be seen that upon a common base I have placed a rotary converter *a* and a direct current motor *b*, with their independent shafts in alinement with each other. It will be understood that the collector rings *c* of the converter are electrically connected to the armature of an alternating current generator (whose position and construction, not being an essential part of my invention, are not shown, except in the diagram, Figure 3.) It will be understood that, as is customary, the brushes of the commutator *d* on the converter are connected electrically with the brushes on the commutator *e* of the direct current motor. The adjacent ends of the two shafts carry the gears *f* and *l* fixed thereon, as shown, and on one of them, as the shaft *m* of the direct current motor, I loosely suspend an arm *k* which has a loose gear *g*, meshing with gears *f* and *l*. The lower end of the arm *k* carries a contact piece *h*, which may travel in either direction over the contact terminals of the rheostat *j*, which may be conveniently placed as shown in Figure 1.

Referring to Figure 3, which shows the same apparatus in diagram, it will be seen that the rheostat coils *j* are in series with the field magnet winding P of the alternating current generator O, and also with the desired exciter Q, and therefore serving to regulate the current flowing in the field magnet winding of the alternating current generator by varying the resistance of its circuit.

From this apparatus it will now be clear that if the voltage of the alternating current generator at O is varied, the voltage of the alternating current at the converter is altered in unison therewith, but the rotary converter, being a synchronous machine, will not be altered in its speed of rotation unless the periodicity of the waves or alternations of potential in the alternating current generators at O is varied. That is, the speed of the converter will not be changed by variations in the voltage of the alternating current. Thus, supposing the two gears *f* and *l* to be rotating in opposite directions at the same speed, the position of the arm *k* will not change to shift the contact piece N of the rheostat. But the direct current voltage delivered to the motor *b* will increase when the alternating current voltage is increased, and will decrease when the latter is decreased, and the rotative speed of the direct current motor will therefore fluctuate in unison with any fluctuations in the voltage of the alternating current generator driving it. In other words, the alternating current voltage and the direct current voltage generated by the rotary converter $a$, and the rotative speed of the direct current motor $b$ will fluctuate in unison, and the alternating current voltage will directly vary the speed of the shaft of the direct current motor, and gear $l$. But when the alternating current voltage of the generator O is increased, and therefore the rotative speed of the direct current motor is increased, the two gears $f$ and $l$ will not rotate at the same speed, and, consequently, the gear $e$ will be driven around and carry with it the arm $k$ which will move the contact piece over the contact terminals of the rheostat $j$ in such a direction as to impose a greater resistance in the circuit of the exciter, and therefore reduce the strength of the field of the alternating current generator O. This will result in decreasing the alternating current voltage and, consequently, the speed of the direct current motor until it attains the same speed as the rotary converter, when the motion of the arm $k$ will cease, but not necessarily at its original position because it may be necessary to take a new position to change the resistance in the field circuit, thus changing the alternating current voltage. That is, when the alternating current voltage is decreased, consequently decreasing the rotative speed of the gear $l$, the relations between the speeds of the gears $l$ and $f$ will be such as to drive the arm $k$ back in the other direction, moving the contact piece $h$ so as to interpose less resistance in the circuit of the field magnet P of the alternating current generator, until a balance of speed is reached. By the continuation of this action, the alternating current voltage will be kept practically constant.

It is to be understood that I do not limit myself to the differential gear mechanism, depending upon the relative speeds of the two shafts of the converter and motor; but the gist of my invention is the provision of any means for varying the voltage of the alternating current generator by reason of variations in the speed of the direct current or other motor with relation to the speed of the synchronous machine. Nor am I confined to the apparatus in which the variation of the resistance at the rheostat varies the current in the circuit of the field magnet of the generator O, as it is evident that such rheostat may, with similar effect, be placed in other circuits connected with the alternating current circuit. The various advantages of the apparatus will be apparent to those familiar with the art.

Having thus described my invention and illustrated its use, what I claim and desire to secure by patent, is the following:—

1. The combination with a generator, a rotary converter supplied with current therefrom, and a driven motor supplied with current from the rotary converter, of means controlled by the relative speeds of the motor and converter for varying the voltage of the generator circuit.

2. The combination with a generator, a rotary converter supplied with current therefrom, and a motor supplied with current from the rotary converter, of a rheostat in the field magnet circuit of the generator, and automatic means controlled by the relative speeds of rotation of the converter and the motor for varying the active resistance of the rheostat.

3. The combination with a generator, a rotary converter supplied with current therefrom, and a motor supplied with current from the rotary converter, of a rheostat in the field magnet circuit of the generator, and a system of gears connected to the shafts of the converter and the motor, and mechanism by which variations of the relative speeds of said two shafts will vary the active resistance of said rheostat.

4. In voltage control apparatus, the combination with a generator, a rotary converter supplied with current therefrom, and a direct current motor supplied with current therefrom, of a rheostat, concentrically mounted gear wheels driven respectively by the shafts of the converter and the motor, an idle gear engaging both of said gears and moving the contact arm of the rheostat, substantially as described.

5. In an automatic voltage control apparatus, the combination with a generator, a rotary converter supplied with current therefrom, and a motor supplied with current from the rotary converter, of a rheostat in the field magnet circuit of the generator, a system of gears driven by the shafts of the converter and the motor, and a differential gear mechanism meshing with said gears and having means for altering the active resistance of the rheostat, substantially as described.

In testimony whereof, I have hereunder signed my name in the presence of the two subscribing witnesses.

CHARLES SUNDERLAND JOHNSON.

Witnesses:
 PAUL CARPENTER,
 ALBERT C. HOWARD.